United States Patent
Germain et al.

(10) Patent No.: US 10,625,702 B2
(45) Date of Patent: Apr. 21, 2020

(54) CLOSING DEVICE FOR A HOUSING FOR AN AIRBAG

(71) Applicants: Christophe Germain, Anzin St Aubin (FR); Caroline Picaud, Marq en Baroeul (FR); Gegory Spingler, Saint-Amand-les-Eaux (FR)

(72) Inventors: Christophe Germain, Anzin St Aubin (FR); Caroline Picaud, Marq en Baroeul (FR); Gegory Spingler, Saint-Amand-les-Eaux (FR)

(73) Assignee: VISTEON GLOBAL TECHNOLOGIES, INC. MI (US)

( * ) Notice: Subject to any disclaimer, the term of this patent is extended or adjusted under 35 U.S.C. 154(b) by 0 days.

(21) Appl. No.: 14/312,793

(22) Filed: Jun. 24, 2014

(65) Prior Publication Data

US 2014/0375030 A1 Dec. 25, 2014

(30) Foreign Application Priority Data

Jun. 24, 2013 (FR) .................................... 13 56003

(51) Int. Cl.
*B60R 21/215* (2011.01)
*B60R 21/2165* (2011.01)

(52) U.S. Cl.
CPC ........ *B60R 21/215* (2013.01); *B60R 21/2165* (2013.01); *B60R 2021/21537* (2013.01)

(58) Field of Classification Search
CPC . B60R 21/215; B60R 21/2165; B60R 21/205; B60R 2021/21537; B60R 2021/21512
See application file for complete search history.

(56) References Cited

U.S. PATENT DOCUMENTS

| | | | | |
|---|---|---|---|---|
| 5,863,064 A | * | 1/1999 | Rheinlander | B29C 37/0057 280/728.3 |
| 6,550,803 B1 | * | 4/2003 | Derrick | 280/728.3 |
| 6,753,057 B1 | * | 6/2004 | Gardner, Jr. | 428/43 |
| 7,594,674 B1 | | 9/2009 | Biondo et al. | |
| 8,474,861 B1 | * | 7/2013 | Twork | 280/728.3 |
| 2002/0079675 A1 | * | 6/2002 | Taoka et al. | 280/728.2 |
| 2003/0107206 A1 | * | 6/2003 | Takimoto | B60R 21/206 280/730.1 |
| 2003/0178818 A1 | * | 9/2003 | Schneider et al. | 280/728.3 |
| 2003/0178819 A1 | * | 9/2003 | Schneider et al. | 280/728.3 |
| 2004/0026902 A1 | * | 2/2004 | Yasuda et al. | 280/728.2 |
| 2004/0056455 A1 | * | 3/2004 | Nishijima et al. | 280/728.3 |
| 2004/0232661 A1 | * | 11/2004 | Freystedt | 280/728.3 |
| 2005/0046158 A1 | * | 3/2005 | Abe | 280/730.1 |

(Continued)

FOREIGN PATENT DOCUMENTS

| | | |
|---|---|---|
| CN | 202029803 U | 11/2011 |
| DE | 102004058826 A1 | 6/2006 |

(Continued)

*Primary Examiner* — Barry Gooden, Jr.
(74) *Attorney, Agent, or Firm* — Ipsilon USA, LLP

(57) ABSTRACT

A device to attach to a housing of an airbag is disclosed herein. The device includes a flap connected to an opening of the housing, wherein the flap comprises a rigid structure; and a hinge to connect the flap with the housing. The rigid structure comprises a zone of weakness that ruptures in response to an impact.

12 Claims, 2 Drawing Sheets

(56) References Cited

U.S. PATENT DOCUMENTS

| | | | |
|---|---|---|---|
| 2005/0104337 A1* | 5/2005 | Merrifield | B60R 21/2165 280/728.3 |
| 2005/0269804 A1* | 12/2005 | Yamada et al. | 280/728.3 |
| 2006/0017268 A1* | 1/2006 | Bondoerffer | 280/732 |
| 2006/0028003 A1* | 2/2006 | Soejima | B29C 59/007 280/732 |
| 2006/0033313 A1* | 2/2006 | Horiyama | 280/728.3 |
| 2006/0103117 A1* | 5/2006 | Hayashi | 280/728.3 |
| 2006/0131844 A1* | 6/2006 | Trevino et al. | 280/728.3 |
| 2006/0181065 A1* | 8/2006 | Yamada et al. | 280/728.3 |
| 2006/0186649 A1* | 8/2006 | Izumi | B60R 21/2165 280/732 |
| 2006/0202447 A1* | 9/2006 | Sawada | 280/728.3 |
| 2006/0267313 A1* | 11/2006 | Yasuda et al. | 280/728.3 |
| 2007/0007754 A1* | 1/2007 | Rybinski | B60R 21/205 280/728.3 |
| 2007/0101671 A1* | 5/2007 | Deeks | 52/578 |
| 2007/0108741 A1* | 5/2007 | Yasuda et al. | 280/728.3 |
| 2007/0200318 A1* | 8/2007 | Kamiya | 280/728.3 |
| 2007/0278773 A1* | 12/2007 | Cowelchuck et al. | 280/728.3 |
| 2008/0012273 A1* | 1/2008 | Cowelchuk | B60R 21/2165 280/728.3 |
| 2008/0073885 A1* | 3/2008 | Cowelchuk | B60R 21/205 280/728.3 |
| 2008/0136145 A1* | 6/2008 | Kong | 280/728.3 |
| 2008/0296874 A1* | 12/2008 | Kanno | 280/728.3 |
| 2009/0134608 A1* | 5/2009 | Kang | 280/728.3 |
| 2009/0174173 A1* | 7/2009 | Adachi et al. | 280/730.1 |
| 2009/0288542 A1* | 11/2009 | Matsuno | B26D 3/08 83/879 |
| 2009/0315303 A1* | 12/2009 | Ettinger | 280/728.2 |
| 2010/0045005 A1* | 2/2010 | Augustyniak | 280/728.3 |
| 2010/0084842 A1* | 4/2010 | Kong | 280/752 |
| 2010/0109296 A1* | 5/2010 | Mazzocchi et al. | 280/728.2 |
| 2010/0213691 A1 | 8/2010 | Schupbach | |
| 2010/0327566 A1* | 12/2010 | Matsushima | 280/728.2 |
| 2011/0109067 A1* | 5/2011 | Le Hoang et al. | 280/728.3 |
| 2011/0278827 A1* | 11/2011 | Laboeck et al. | 280/743.2 |
| 2012/0032467 A1* | 2/2012 | Ory | 296/72 |
| 2012/0280476 A1* | 11/2012 | Ory | 280/728.3 |
| 2013/0014627 A1* | 1/2013 | Ito | 83/875 |
| 2014/0077481 A1* | 3/2014 | Matsumoto | 280/728.3 |
| 2014/0151983 A1* | 6/2014 | Schupbach et al. | 280/728.3 |
| 2014/0284904 A1* | 9/2014 | Kim | 280/728.3 |
| 2014/0375029 A1* | 12/2014 | Pauthier et al. | 280/728.3 |

FOREIGN PATENT DOCUMENTS

| | | |
|---|---|---|
| EP | 1510415 A1 | 3/2005 |
| FR | 2925410 A1 | 6/2009 |
| FR | 2927290 A1 | 8/2009 |

* cited by examiner

CLOSING DEVICE FOR A HOUSING FOR AN AIRBAG

CROSS-REFERENCE TO RELATED APPLICATIONS

This U.S. Patent Application claims priority to French Patent Application No. 13 56003, filed Jun. 24, 2013 entitled "CLOSING DEVICE FOR A HOUSING FOR AN AIRBAG," the entire disclosure of the application being considered part of the disclosure of this application and hereby incorporated by reference.

BACKGROUND

The current construction of embedded housings for airbags or inflatable protective cushions involves a closing cover which is intended to be separated from the housing at the time of release and inflation of the airbag.

According to a common design, this cover can be constructed in the form of one or more flaps held by hinges on the side edges of the opening of the housing. At the time of deployment of the airbag, under the pressure of the expulsion, these flaps are then projected by pivoting toward the outside of the housing while remaining held to the side edges of the opening by hinges. The hinges therefore prevent the flaps from being projected against a driver or passenger when the airbag being deployed is expelled from the housing.

However, when the airbag is in the process of being deployed, this rapid opening of the embedded housing violently projects the flap against the surface of the dashboard. At the time of this projection, the projection can lead to bouncing of the flap against the wall of the dashboard, which results in the flap returning to position at the site of the housing and impeding the optimal deployment of the airbag.

An existing alternative for overcoming this problem consists of replacing the lid by a closing cover which is intended to be torn by the airbag during its deployment. However, this technical solution requires the cover to be somewhat weak in order to be functional, which can be a non-negligible disadvantage in the context of the construction of a dashboard. Moreover, this solution does not make it possible to respond to the problem of the dashboard being resistant to cold, so that if the temperature is between a range, for example −50° C. to 0° C., the cover may rupture randomly at the time of the deployment of the airbag.

SUMMARY

A device to attach to a housing of an airbag is disclosed herein. The device includes a flap connected to an opening of the housing, wherein the flap comprises a rigid structure; and a hinge to connect the flap with the housing. The rigid structure comprises a zone of weakness that ruptures in response to an impact.

DESCRIPTION OF THE DRAWINGS

The invention will be understood better based on the following description which refers to a preferred embodiment given as a nonlimiting example and explained in reference to the appended diagrammatic drawings in which.

DETAILED DESCRIPTION

Disclosed herein is a technique to overcome the problems stated in the background by providing a rigid lid for the housing of an airbag while at the same time allowing an optimal deployment of the airbag at the time of its inflation. This is achieved by optimizing the absorption of the impact of the lid against the wall of a dashboard or of a structure of the passenger space of the vehicle.

A closing device for a housing for an airbag formed by at least one flap connected by at least one hinge to the opening of the housing is provided, the flap including a rigid structure integrating at least one zone of weakness allowing rupturing of this structure in case of impact.

Also disclosed is a closing system for a housing for an airbag, integrating at least one device being employed at the site of at least one flap arranged so that at least one hinge is oriented horizontally at the lower edge of the flap.

Figure 1:
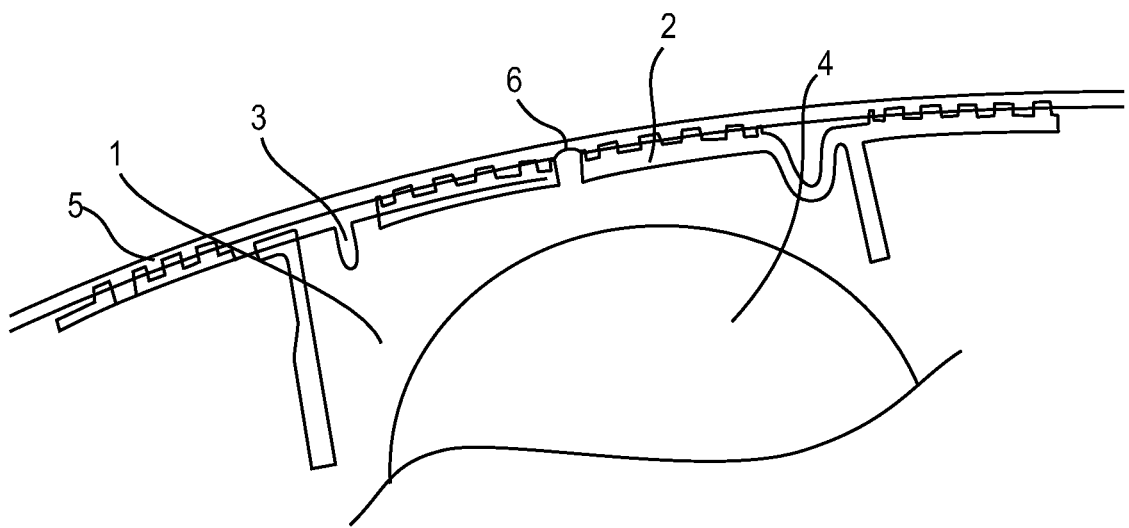
FIG. 1 illustrates an example of a closing device for a housing an airbag.
Figure 3:
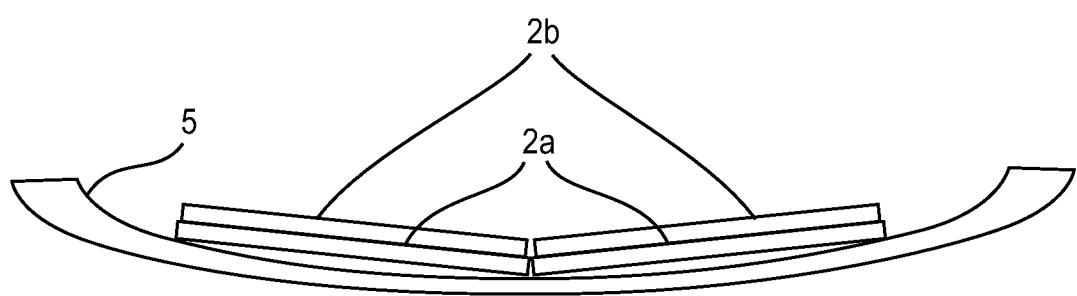
FIG. 3 illustrates a diagrammatic representation of a flap cross section after the triggering of an airbag.

FIG. 1 illustrates an example of a closing device for a housing 1 an airbag 4.

Also disclosed is a closing device for a housing 1 for an airbag 4, formed by at least one flap 2 connected by at least one hinge 3 to the opening of the housing 1, characterized in that the flap 2 includes a rigid structure 2a integrating at least one zone of weakness 6 allowing rupturing of this structure 2a in case of impact.

In one example, the thickness of the flap 2 includes in a superposed manner at least one rigid structure 2a integrating at least one zone of weakness 6 allowing for the rupturing of structure 2a in case of impact. Accordingly, a flexible structure 2b may be provided to allow the preservation of a connection to one another of the different parts of the broken rigid structure 2a.

The closing device for a housing 1 guarantees that the flap 2 breaks at the the zone of weakness 6 when said flap 2 hits the surface of the dashboard 5 during actuation and deployment of the airbag 4. Due to the breaking or even simply the deformation of the flap 2 against the surface of the dashboard 5, the phenomenon of bouncing of the flap 2 on the dashboard 5 is decreased, or even eliminated, thus preventing any impediment to the inflation and optimized deployment of airbag 4. The flexible structure 2b integrated in the flap 2 of the device of the invention ensures that the different parts of the rigid structure 2a, once said structure 2a has broken, are held together. Moreover, this flexible structure 2b is adapted to ensure absorption of the impact of the flap 2 against the surface of the dashboard 5.

The flexible structure 2b may be made from a resilient material in order to withstand deformation in case of impact along an axis substantially perpendicular to the middle plane of the flap 2. In another example, the flexible structure 2b, which is made of a flexible fabric material capable of being attached by overmolding with a fiberglass reinforced plastic material. Thus, the structure of the flap 2 allows a combination of the properties of flexibility and rigidity of the elements that constitute it.

According to a particular method for constructing the closing device of the housing 1, the flap 2 is formed by an alternating superposition of rigid structures 2a and flexible structures 2b. A specific method of constructing this embodiment feature relates to a closing device of the housing 1, the flap 2 being formed by an alternating superposition of a flexible structure 2b arranged between two rigid structures 2a.

Figure 2A:
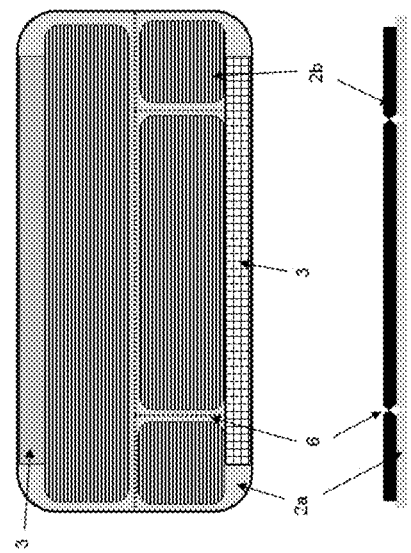
FIGS. 2a and 2b illustrate a diagrammatic representation of a top view and of a flap cross section prior to a triggering of an airbag.
Figure 2B:
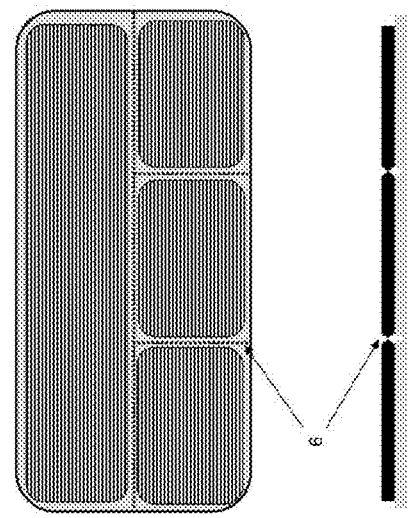
Figure 2B:
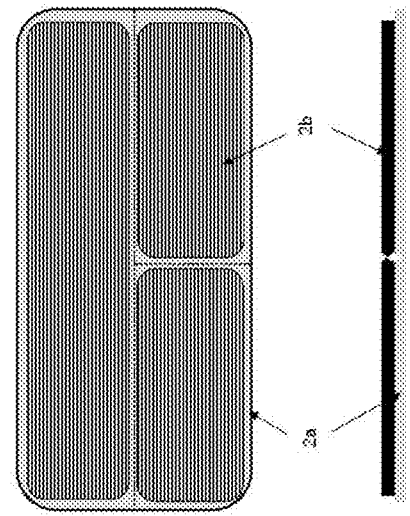

FIGS. 2a and 2b illustrate a diagrammatic representation of a top view and of a flap cross section prior to a triggering of an airbag.

At the time of the deployment of the airbag 4, the flap 2 positioned initially at the site of the opening of the housing 1 is projected against the surface of the dashboard 5, pivoting at the site of the dashboard 5's hinge 3 which connects it at the edge of the opening of the housing 1. At the end of the projection path, the flap 2 makes contact with the surface of the dashboard 5. The flexible structure 2b allows the flap 2, once the rigid structure 2a is broken or simply deformed, to match the shape of the surface of the dashboard 5 at least partially. By being capable of adapting to the general shape of the surface of the dashboard 5, the open flap 2 makes it possible to provide a larger space for the airbag 4 to be deployed.

In another example, the closing device for housing 1 is constructed so that the flap 2 is formed by a flexible structure 2b arranged on the internal face of the rigid structure 2a.

The superposition of rigid structure 2a and flexible structure 2b in the thickness of the flap 2 is not performed in a limiting manner and can be carried out in any manner that permits a connection to one another of the different parts of the broken rigid structure 2a.

The zones of weakness 6 are introduced by reducing thickness of the rigid structure 2a of the flap 2.

The flexible structure 2b may include at least one zone of weakness produced by a reduced thickness of the flexible structure 2b, said zone(s) being arranged opposite at least one zone of weakness 6 of the rigid structure 2a of the flap 2. According to this particular arrangement, the superposition of the zone of weakness 6 of the rigid structure 2a over that of the flexible structure 2b allows breaking at the zone of weakness 6 of the flap 2 which forms the cover of the housing under pressure of the airbag 4 during inflation.

The zones of weakness 6 are produced by introducing a less rigid area oriented perpendicular to the pivoting axis of the hinges 3 of the flap 2. This particular arrangement makes it possible to ensure breaking of the rigid surface 2a of the flap 2 and adaptation of the flap 2 to the surface of the dashboard 5, when the dashboard opens slightly in a curved fashion along an axis parallel to the pivoting axis of the flap 2 and/or perpendicular to the axis of the lines of weakness.

Additionally, these zones of weakness 6 are produced by intersecting lines of weakness at the site of the rigid surface 2a of the flap 2. Such an arrangement of these zones of weakness 6 allows subdividing of the entire surface of the rigid structure 2a of the flap 2, and reduction or even elimination of its rigidity.

The closing device may be implemented with a flexible structure 2b that is a single structure provided with a hinge 3. To achieve this, the flexible structure 2b integrated in the flap 2 is extended at one of the edges of the flap 2 to produce one or more of the hinges 3 of the flap 2. The hinges 3 are then formed by extensions of the flexible structure 2b of the flap 2, the end of these extensions being attached to the edge of the opening of the housing 1 of the airbag 4.

According to another example, the closing system may integrate several flaps 2 to bring about the closing of the housing 1. In such a closing system, each one of the flaps 2 of the cover of the housing 1 is hinged with the edge of the opening of the housing 1 by a hinge 3.

Also disclosed is a closing system for a housing for an airbag 4, integrating at least one device according to the invention, characterized in that this device is used at the site of at least one flap 2 arranged so that at least one hinge 3 is oriented horizontally at the lower edge of the flap 2.

The invention claimed is:

1. A device to attach to a housing of an airbag, comprising:
   a flap, the flap connected to an opening of the housing, wherein the flap is a rigid structure, wherein the flap is defined with a thickness direction, and
   a hinge to connect the flap with the housing, wherein the hinge is configured to pivot the flap toward an interior of a vehicle in which the airbag is housed or toward a passenger of the vehicle,
   wherein the rigid structure comprises a plurality of zones of weakness that rupture in response to an impact, the zones of weakness being defined by a portion of the rigid structure, the portion being reduced in thickness to a predetermined thickness away from the hinge, wherein the plurality of zones of weakness in the rigid structure subdivide the entire surface of the rigid structure, and
   the flap further comprises a flexible structure to preserve a connection between the rigid structure in response to the zones of weakness of the rigid structure rupturing in response to the impact,
   the flap comprises the flexible structure arranged on an internal face of the rigid structure, and
   the flexible structure comprises a corresponding plurality of zones of weakness formed by reducing a thickness of the flexible structure, wherein the plurality of zones of weakness in the flexible structure are arranged opposite said plurality of zone of weakness in the rigid structure, and
   the zones of weakness of the flexible structure and the zones of weakness of the rigid structure overlap each other in the thickness direction of the flap, wherein the lines of weakness are mutually superposed with each other,
   wherein the zones of weakness of the rigid structure is configured to break into parts upon the impact with a surface of a dashboard, and the zones of weakness of the flexible structure are configured to maintain a connection upon the impact with the dashboard, and the rigid structure is configured to deform to match the shape of a surface of the dashboard upon being broken into the parts along the lines of weakness,
   wherein the flap includes a sufficient plurality of zones of weakness in said rigid structure and said flexible structure that when said flap impacts the dashboard at the end of its pivoting due to the deployment of the airbag and deforms to match the shape of the surface, the energy of the impact is a substantially absorbed preventing said flap from bouncing back off of the dashboard and preventing impingement of the deployment of said airbag,
   the plurality of lines of weakness of both the rigid structure and the flexible structure extend in a direction perpendicular to a direction of the pivot axis of the hinge and in an intermediary portion of the flap.

2. The device of claim 1, wherein the flap further comprises a second rigid structure.

3. The device of claim 1, wherein the flexible structure is made from a resilient material to withstand deformation in case of the impact along an axis perpendicular to a middle plane of the flap.

4. The device of claim 1, wherein the flexible structure is singularly provided with the hinge.

5. The device of claim 1, wherein the flap is arranged so that the hinge is oriented horizontally at a lower edge of the flap.

6. The device of claim 1, wherein the rigid structure is ruptured into at least a first part and a second part, and the flexible structure maintains a connection between the first part and the second part.

7. The device of claim 1, wherein the flap comprises a second rigid structure, the rigid structure and the second rigid structure being disposed to sandwich the flexible structure.

8. The device of claim 1, further comprising at least two zones of weakness of the rigid structure, and at least two zones of weakness of the flexible structure, both of the at least two zones of weakness extending in a direction perpendicular to the pivot,
- wherein the at least two zones of weakness of the rigid structure each overlap with a respective one of the at least two zones of weakness of the flexible structure, and are disposed in an intermediary portion of the flap,
- and the at least two zones of weakness of the rigid structures are configured to break upon the impact with a surface of a dashboard, and the at least two zones of weakness of the flexible structure is configured to maintain a connection upon the impact with the dashboard.

9. The device of claim 1, wherein the flexible structure comprises a flexible fabric material.

10. The device of claim 9, wherein the flexible fabric material is combined with an overmolded fiberglass reinforced plastic material.

11. A device to attach to a housing of an airbag, comprising:
- a flap of, the flap connected to an opening of the housing, wherein the flap is a rigid structure, wherein the flap is defined with a thickness direction,
- a hinge to connect the flap with the housing, wherein the hinge is configured to pivot the flap toward an interior of a vehicle in which the airbag is housed or toward a passenger of the vehicle,
- wherein the rigid structure comprises a plurality of zones of weakness that rupture in response to an impact, the zones of weakness being defined by a portion of the rigid structure, the portion being reduced in thickness to a predetermined thickness away from the hinge, wherein the plurality of zones of weakness in the rigid structure subdivide the entire surface of the rigid structure, and
- the flap further comprises a flexible structure to preserve a connection between the rigid structure in response to the zones of weakness of the rigid structure rupturing in response to the impact,
- the flap comprises the flexible structure arranged on an internal face of the rigid structure, wherein the zones of weakness of the rigid structure are configured to break into parts upon the impact with a surface of a dashboard, and the zones of weakness of the flexible structure are configured to maintain a connection upon the impact with the dashboard, and the rigid structure is configured to deform to match the shape of a surface of the dashboard upon being broken into the parts,
- wherein the flap includes a sufficient plurality of zones of weakness in said rigid structure and said flexible structure that when said flap impacts the dashboard at the end of its pivoting due to the deployment of the airbag and deforms to match the shape of the surface, the energy of the impact is a substantially absorbed preventing said flap from bouncing back off of the dashboard and preventing impingement of the deployment of said airbag,
- the plurality of lines of weakness of both the rigid structure and the flexible structure extending in a direction perpendicular to a direction of the pivot axis of the hinge and in an intermediary portion of the flap, and
- the at least one second line of weakness extending parallel to the direction of pivot of the hinge and intersecting the at least one first line of weakness of the rigid structure.

12. The device of claim 11, wherein the flexible structure comprises a flexible fabric material.

* * * * *